Aug. 17, 1965  R. BERNSTEIN ETAL  3,201,141
TANDEM AXLE WHEEL SUSPENSION INCLUDING AXLE LIFT
Filed June 26, 1962  3 Sheets-Sheet 1
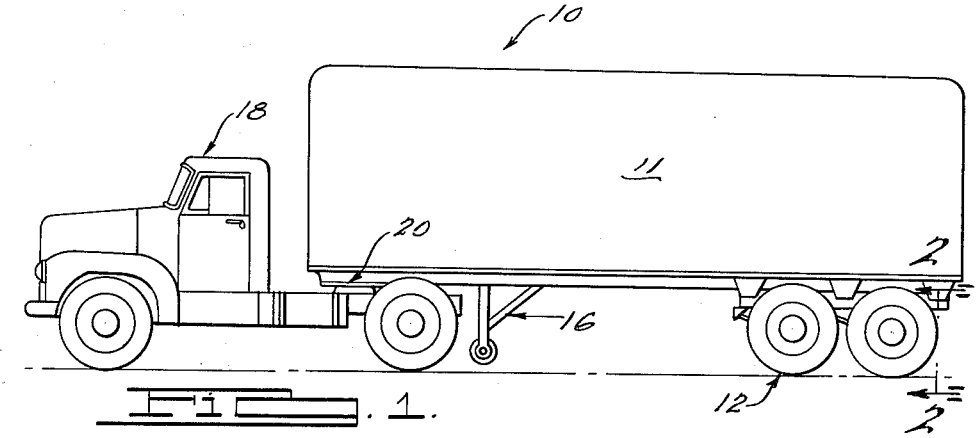
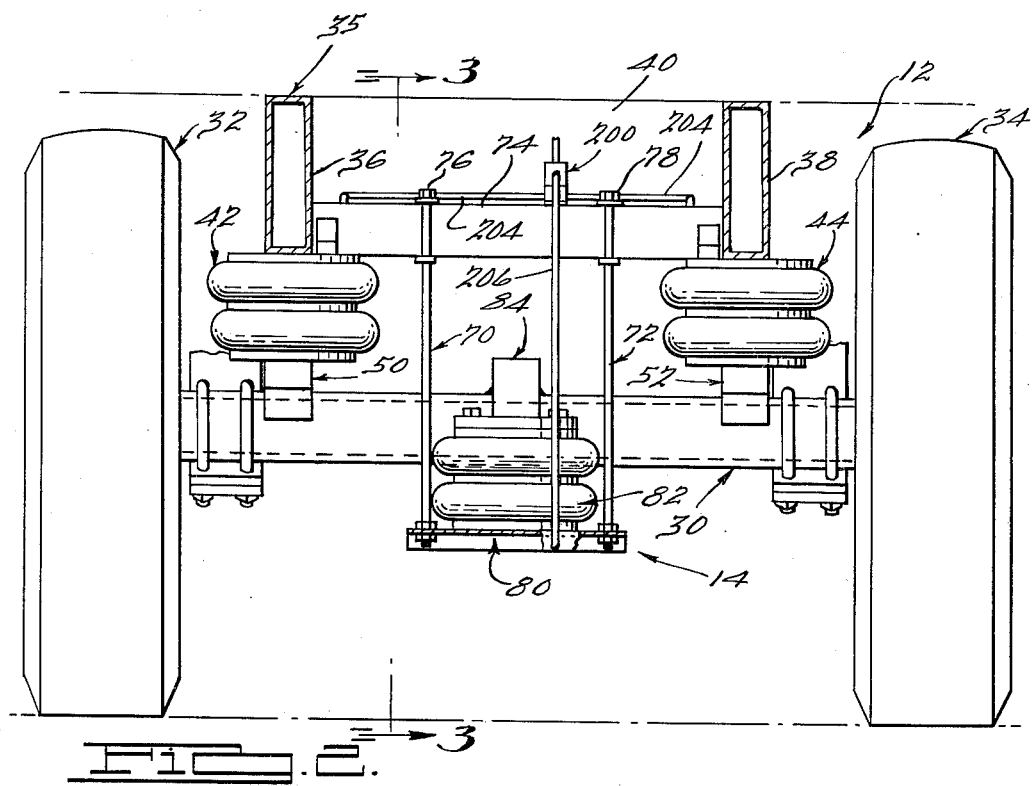
INVENTORS.
Robert Bernstein
Adrian F. Hulverson
BY
Harness, Dickey & Pierce
ATTORNEYS.

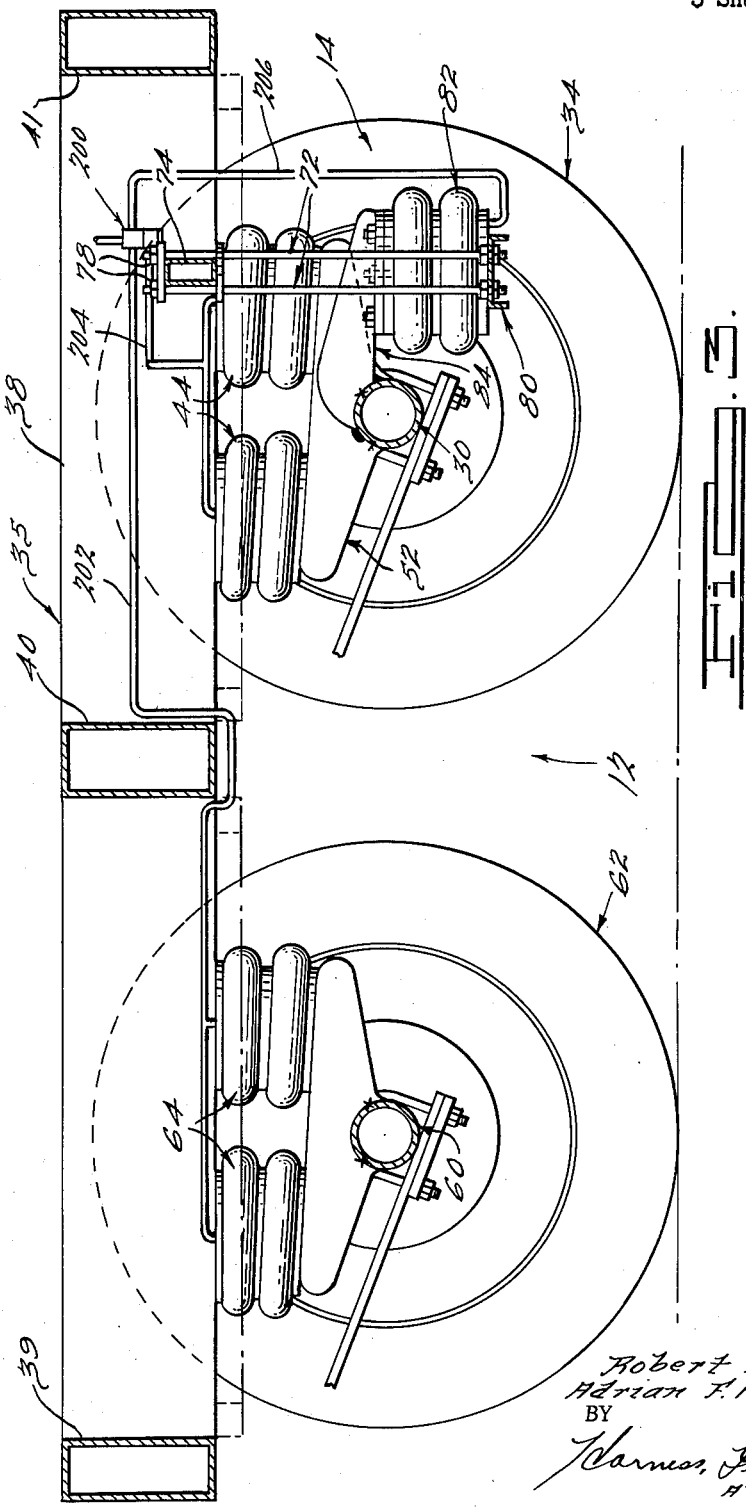

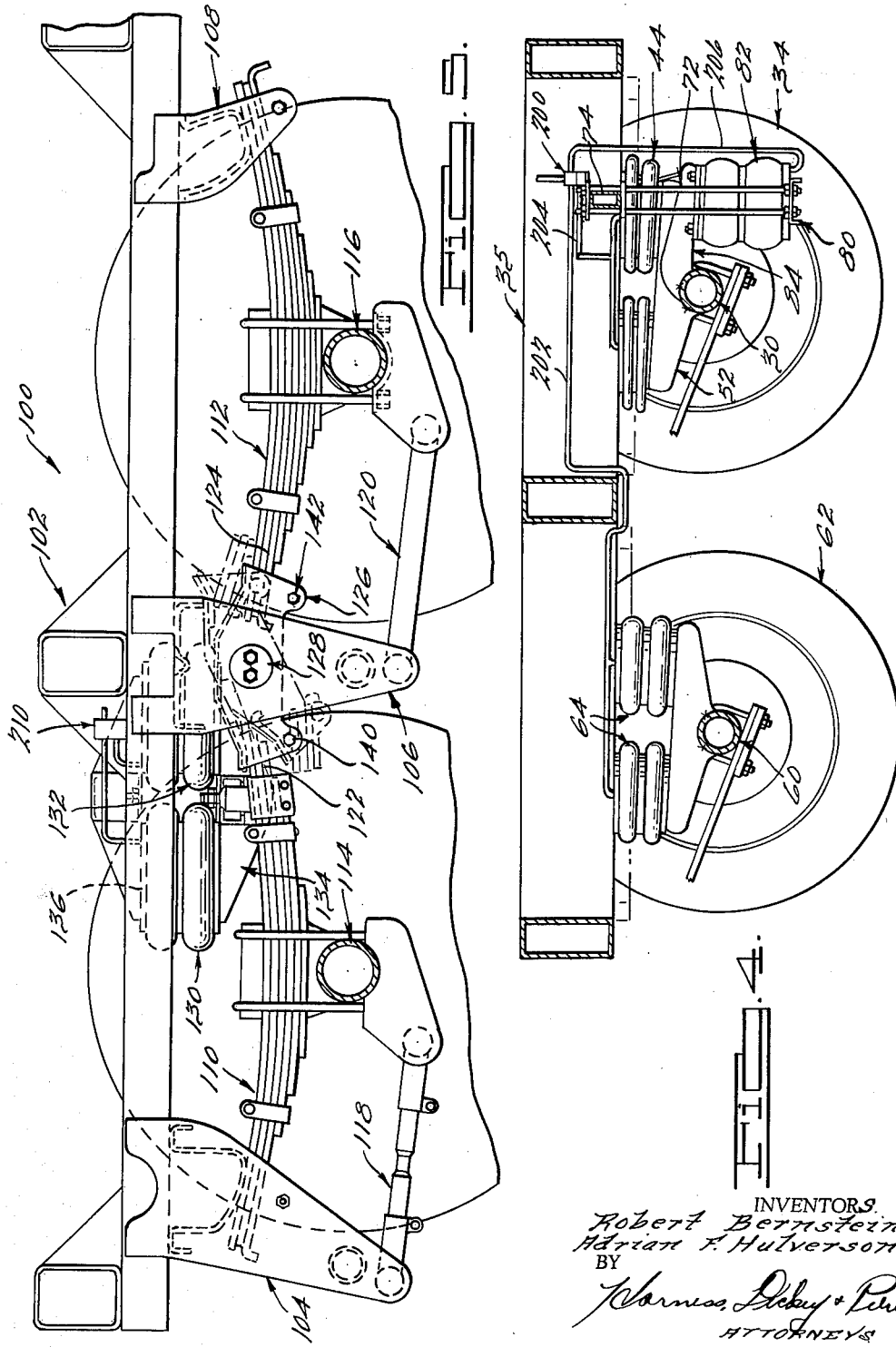

United States Patent Office 3,201,141
Patented Aug. 17, 1965

3,201,141
TANDEM AXLE WHEEL SUSPENSION
INCLUDING AXLE LIFT
Robert Bernstein, Omaha, Nebr., and Adrian F. Hulverson, Drayton Plains, Mich., assignors to Fruehauf Corporation, a corporation of Michigan
Filed June 26, 1962, Ser. No. 205,260
1 Claim. (Cl. 280—104.5)

This invention relates generally to suspension systems for heavy duty trucks, trailers and the like and more particularly to an improved tandem wheel suspension having an axle lift for raising one axle thereof to facilitate highway travel of a truck or trailer in the lightly loaded condition.

One problem inherent in heavy duty trucks and trailers is that the riding and handling characteristics of the truck or trailer are relatively poor when it is traveling with relatively light loads. Such characteristics are due to the relatively high spring rate of the wheel suspension of such vehicles necessary to accommodate heavy loads.

One way to alleviate this problem in vehicles having a tandem wheel suspension is to remove the road-engaging wheels on one of the tandem axles from contact with the road, which, in addition to improving the handling characteristics of the vehicle, saves wear on one set of tires.

A tandem axle wheel suspension including an axle lift in accordance with the instant invention achieves elevation of one of a pair of axles with a minimum of difficulty and may be fully automatic or manually operated. The wheel suspension comprises an air bag suspended below one of the tandem axles in such a manner that, upon pressurization of the air bag, the axle is elevated relative to the frame of the wheel suspension. Pressurization of the axle lift air bag can be rendered fully automatic by relating pressurization to depressurization of the load supporting air bags, or, alternatively, in a conventional leaf spring suspension, due to unloading of the springs of the wheel suspension.

Accordingly, one object of the instant invention is an improved means for lifting one of a pair of tandem axles to facilitate highway travel of a vehicle in the lightly loaded condition.

Another object is an improved axle lift wherein elevation of one of a pair of tandem axles is accomplished by an inflatable air bag.

Another object of the instant invention is a means for elevating one of a pair of tandem axles, spring supported from a vehicle frame, by an inflatable air bag.

Other objects and advantages of the instant invention will be apparent in the following description, claim and drawings wherein:

FIGURE 1 is an elevational view of a semi-trailer having a wheel suspension in accordance with the instant invention;

FIG. 2 is a view taken susbstantially along the line 2—2 of FIGURE 1;

FIG. 3 is a cross-sectional view taken substantially along the line 3—3 of FIG. 2;

FIG. 4 is a cross-sectional view similar to FIG. 3 showing a rear axle of the tandem suspension in the elevated condition; and FIG. 5 is a cross-sectional view similar to FIG. 3 of an equalized tandem axle spring suspension having an air bag axle lift in accordance with another embodiment of the instant invention.

As best seen in FIGURE 1 of the drawings, a heavy duty vehicle 10 comprises a van-type trailer 11 having a tandem axle wheel suspension 12. The wheel suspension 12 is provided with an improved axle lift 14 (FIG. 2) in accordance with an exemplary embodiment of the instant invention. The trailer 11 is provided with a landing gear 16 and is coupled to a tractor 18 as by a fifth wheel 20 in the conventional manner. It is to be noted that the trailer 11 and associated components are conventional in construction except for the improved axle lift 14, as will be discussed hereinafter.

As best seen in FIG. 2 of the drawings, the wheel suspension 12 comprises a transverse rear axle 30 having road-contacting wheels 32 and 34 at opposite ends thereof. The axle 30 is suspended from a frame 35 comprising laterally spaced longitudinal members 36 and 38 which are joined by a plurality of transverse members 39, 40 and 41. Pairs of conventional air springs 42 and 44 extend downwardly between the frame members 36 and 38, and suitable spring brackets 50 and 52, respectively, which are secured to the axle 30 as by welding.

As best seen in FIG. 3, the wheel suspension 12 has a front axle 60 having conventional road-contacting wheels 62 and air springs 64 that are suspended from the wheel suspension frame 35 in the conventional manner. The axle lift 14 of the instant invention is applied only to the rear axle 30 of the wheel suspension 12 to effect elevation thereof when the trailer 11 is slightly loaded, at which time the entire load of the trailer 11 is carried by the axle 60 in the conventional manner. Therefore, a detailed description of the front axle 60 and its associated components will be omitted for the purpose of clarity.

The axle lift 14 comprises spaced pairs of downwardly extending hanger bolts 70 and 72 that are secured to a transverse member 74 of the suspension frame 35 as by complementary pairs of nuts 76 and 78, respectively. The hanger bolts 70 and 72 support a laterally extending air spring support plate 80 in an underlying relationship relative to the axle 30. An air spring 82 extends between the plate 80 and a rearwardly extending arm 84 that is secured to the axle 30, as by welding.

As best seen by comparing FIGS. 3 and 4 of the drawings, concomitant deflation of the air springs 42 and 44 and inflation of the air spring 82 effects elevation of the axle 30 relative to the wheel suspension frame 35, thereby to elevate the road-contacting wheels 32 and 34 to condition the trailer 11 for travel in the lightly loaded condition.

As best seen in FIG. 5 of the drawings, a modified wheel suspension 100 comprises a frame 102 having downwardly depending hangers 104, 106 and 108 thereon for the support of laterally spaced pairs of longitudinally extending leaf springs 110 and 112. It is to be understood that like hangers and leaf springs are provided on opposite sides of the frame 102 for the support of front and rear axles 114 and 116, in the conventional manner.

The axle 114 is connected to the hanger 104 as by a radius rod 118 and the axle 116 to the hanger 106, as by a radius rod 120. The wheel suspension 100 is of the equalizing type, a rearward end portion 122 of the spring 110 and a forward end portion 124 of the spring 112 engaging a rockable equalizing lever 126 that is pivoted for rotation as by a shaft 128 in the hanger 106.

In accordance with the instant invention, a pair of axle lift air bags 130 and 132 extend between a plate 134 on the rearward end 122 of the spring 110 and an upper plate 136 on the frame 102. When the wheel suspension 100 is in a heavily loaded condition, the air bags 130 and 132 are deflated, permitting the end portions 122 and 124 of the springs 110 and 112 to ride on the equalizing lever 126. However, at such time as the wheel suspension 100 is relatively lightly loaded, the air bags 130 and 132 are pressurized, forcing the rearward end 122 of the spring 110 downwardly, so as to engage a transverse pin 140 on the equalizer 126, rotating the equalizer 126 counterclockwise, as seen in FIG. 5 of the drawings.

Counterclockwise rotation of the equalizer 126 brings the transverse pin 142 thereof into engagement with the underside of the forward end portion 142 of the spring 112, thereby to elevate the forward end portion 142 and effect elevation of the axle 116.

In accordance with one feature of the instant invention, the axle lift 14 of the instant invention is relatively easily controlled, either automatically or manually. When, for example, the trailer 11 is provided with an air spring suspension and is fully loaded, air pressure in the air springs 44 and 64 is approximately 60 pounds per square inch. When the trailer is unloaded, this pressure drops to approximately 5 pounds per square inch. This pressure differential between the loaded and unloaded condition is utilized for the control of a pressure-sensitive air relay valve 200 on the lateral member 74 of the frame 35. The relay valve 200 is operatively connected to the air springs 64 as by a conduit 202, to the air springs 44 as by a conduit 204 and to the axle lift air bag 82 as by conduit 206. The axle lift air bag is normally vented to atmosphere by the valve 200. The valve 200 is adjusted so that when air pressure in, for example, the air springs 42, 44 and 64 drops below, for example, 20 pounds per square inch, the valve 200 effects depressurization of the air springs 42 and 44 by venting them to atmosphere and pressurization of the axle lift air bag 82 by connecting it to the front bags 64 thereby to automatically effect elevation of the axle 30. As seen in FIGURE 3 of the drawings the valve 200 is connected to a source of high pressure air. The valve 200 is also connected to the rear air springs 42, 44 and front air springs 64. The connection between the source of high pressure air and the front air bags 64 is constant. The connection between the rear air bags 44 and the source of high pressure air is through a differential pressure responsive shuttle valve of conventional construction. Such a valve is disclosed in, for example, Patent Nos. 3,088,481; 2,905,191; 2,900,166; or 2,651,491. In essence the valve 200 senses a differential pressure across the rear air bags 42, 44 and the source. When the differential exceeds a predetermined maximum the valve shuttle is spring biased to connect the source to the air lift bag 82 concomitantly venting the air lift bag 82. Preferably, the air springs 42, 44 are vented when the air lift bag 82 is energized and vice versa. Such a system renders operation of the axle lift 14 so completely automatic that when the trailer is heavily loaded, all ground-engaging wheels thereof are in contact with the ground, but when the load is removed, one of the axles is lifted automatically. Alternatively, the relay 200 can be electrically operated to allow operator selection of lift or no lift.

As seen in FIG. 5, pressurization of the axle lift air bag 130 is controlled by a relay valve 210 that may be electrically operated to provide manual control or automatically operated in response to deflection of the spring 110 under load.

From the foregoing description it should be apparent that the air lift 14 of the instant invention is relatively simple yet positive in operation. It is adapted for either automatic or manual operation to effect elevation of one of a pair of tandem axles to facilitate operation of a heavy duty vehicle in a lightly loaded condition.

It is to be understood that the specific construction of the improved axle lift herein disclosed and described is presented for the purpose of explanation and illustration and is not intended to indicate the limits of the invention, the scope of which is defined by the following claim.

What is claimed is:

A tandem axle wheel suspension for a heavy duty vehicle comprising
 a frame,
 a pair of axles having road engaging wheels at the ends thereof, respectively,
 spaced pairs of load air springs extending between said frame and said axles, respectively,
 an air spring support plate suspended from said frame in spaced underlying relationship relative to the one of said axles for supporting an air bag,
 an axle lift air bag secured to and extending upwardly between said plate and the one axle of said wheel suspension, and an automatic pressure sensitive valve connected to said load air springs and said axle lift air bag, said valve being operable to vent the load air springs on said one axle upon the occurrence of a relatively low pressure therein and connect the axle lift air bag to a source of relatively high pressure air thereby to effect deflation of the load air spring and for said one axle and inflation of the air lift bag to increase the spacing between said plate and the one axle thereby to elevate the one axle relative to said frame.

References Cited by the Examiner

UNITED STATES PATENTS

| | | | |
|---|---|---|---|
| 2,599,043 | 6/52 | Bissell | 180—22 |
| 2,934,351 | 4/60 | Masser. | |
| 3,053,335 | 9/62 | Gnade | 180—22 |

FOREIGN PATENTS

| | | |
|---|---|---|
| 209,439 | 7/57 | Australia |
| 630,017 | 10/61 | Canada |

MILTON BUCHLER, *Primary Examiner.*
A. HARRY LEVY, *Examiner.*